United States Patent [19]
Gentry et al.

[11] 4,022,571
[45] May 10, 1977

[54] INDUSTRIAL HEATING

[75] Inventors: Charles B. Gentry, Grand Rapids; William A. Phillips, Comstock Park, both of Mich.

[73] Assignee: AGM Industries, Inc., Grand Rapids, Mich.

[22] Filed: Oct. 10, 1975

[21] Appl. No.: 621,302

[52] U.S. Cl. .................................. 432/180; 165/8
[51] Int. Cl.² .................. F27D 17/00; F23L 15/02
[58] Field of Search .............. 165/6, 7, 8; 432/179, 432/180

[56] References Cited
UNITED STATES PATENTS

| | | | |
|---|---|---|---|
| 286,110 | 10/1883 | Bissell | 432/180 |
| 1,590,373 | 6/1926 | Holbeck | 165/6 |
| 1,658,332 | 2/1928 | Hanley, Jr. | 432/179 |
| 1,944,074 | 1/1934 | Forter | 165/7 |
| 2,147,997 | 2/1939 | Sprenger | 432/179 |
| 2,809,811 | 10/1957 | Blomquist | 165/7 |
| 3,384,358 | 5/1968 | Morton | 165/6 |
| 3,695,250 | 10/1972 | Rohrs | 165/7 |

Primary Examiner—John J. Camby
Attorney, Agent, or Firm—McGarry & Waters

[57] ABSTRACT

An industrial heating furnace wherein heat in exhaust gases is transferred to combustion air for burners in the furnace through a rotary ceramic heat exchanger. In one embodiment, turbulating air pipes are positioned in the furnace and the heated combustion air is supplied to the turbulating air pipes as well. The turbulating air pipes may be juxtaposed to and positioned across an elongated heating chamber. Liquid fuel in atomized form can be injected into the heated combustion air upstream of the burner.

17 Claims, 3 Drawing Figures

INDUSTRIAL HEATING

BACKGROUND OF THE INVENTION

1. Field of the Invention

The invention relates to industrial heating furnaces. In one of its aspects, the invention relates to a heating furnace wherein the heat of exhaust gases is recovered for combustion air. In another of its aspects, the invention relates to a heating furnace wherein the heat of exhaust gases is recovered for use in turbulating air within the furnace. In still another of its aspects, the invention relates to a heating furnace having a simplified oil conversion system.

2. State of the Prior Art

Recent increases in fuel costs and projected scarcity of fuel have greatly increased the interest in energy conservation in industrial processes. For example, in fume incineration, the heat of incineration has been recovered and used for preheating the fume-containing feed to the incinerator. See Gentry, U.S. Pat. No. 3,706,445, issued Dec. 19, 1972, and Hardison et al, U.S. Pat. No. 3,484,189, issued Dec. 16, 1969.

It has recently been suggested to make a rotary regenerator or heat exchanger wheel from a thermally stable ceramic material such as CER VIT, and to use such a regenerator in an industrial incineration process. For example, see Rosenberg et al, U.S. Pat. No. 3,509,834, issued May 5, 1970. Such ceramic heat exchanger wheels are well known in the automotive industry to recover heat from turbine engine exhaust.

The use of the heat in the exhaust from an industrial heating furnace with the use of a shell and tube heat exchanger for preheating combustion air is disclosed in the U.S. Pat. to Bradshaw No. 1,476,142, issued Dec. 4, 1923. The shell and tube heat exchangers are very expensive to construct, are very large and very heavy Furthermore, these heat exchangers are relatively inefficient in that the heat must pass through thick metal tubes.

With the shortage of natural gas, industrial customers who purchase gas on an interruptable basis must have oil conversion systems for industrial processes in the event that gas service is terminated. Normally such conversion systems include a standard oil burner which heats the combustion air to raise the temperature of the air so that atomized oil can be injected into the combustion air stream and burned in the burner. This system requires expensive capital equipment and is also relatively inefficient.

It has recently been suggested that atomized oil can be injected directly into a preheated fume and air mixture in an industrial incinerator to convert a gas burning incinerator to an oil fired incinerator wherein the fume and air mixture is heated to a temperature above the vaporization point of the atomized oil.

SUMMARY OF THE INVENTION

According to the invention an industrial heating furnace for billets and the like has a heating chamber and at least one and preferably multiple fuel burners for supplying heated gases to the heating chamber. Means are provided for withdrawing exit gases from the chamber. A rotary ceramic heat exchanger wheel is mounted for rotation about its axis and means are provided for supplying air to a cold side of the heat exchanger wheel. A first conduit in communication with the air supply means through the heat exchanger wheel is provided for withdrawing heated air from a hot side of the heat exchanger wheel to pass the heated air to the fuel burner of combustion air. A second conduit removes the exhaust gases from the heating chamber and passes the exhaust gases to the hot side of the rotating heat exchanger wheel for heat exchange with the combustion air. Means are provided at a cool side of the heat exchanger wheel and in communication with the second conduit through the rotary heat exchanger for withdrawing and exhausting the gases through the rotary heat exchanger. Rotation of the rotary heat exchanger thus recovers the heat of the exhaust for combustion air. A thermally stable refractory or ceramic gap seal is provided for the heat exchanger wheel to minimize loss of air across the wheel.

By this system, substantial savings are provided in fuel required to heat the furnace because of the savings in heating of the combustion air. The system is possible because of the ceramic heat exchange wheel which has a relatively low and consistent air leakage across it and a relatively high degree of heat transferability. The ceramic heat exchanger permits the entire system to operate with two conventional fans, both at the cold side of the heat exchanger. A rotary metal heat exchanger would not be appropriate for this purpose because of the relatively high and unreliable air loss across the wheel. Such a system would possibly require a fan on the hot side of the heat exchanger in order to supply adequate pressure to the burners. This additional fan would markedly increase the cost of the system.

Further, according to the invention, turbulating air pipes having nozzle openings therein are provided within the heating chamber to direct turbulating gases against the work in the furnace. A third conduit between the first conduit and the turbulating air pipes passes the heated air to the turbulating air pipes. In one embodiment, the turbulating air pipes are juxtaposed to a plurality of the burners in the furnace heating chamber. In this embodiment, the heating chamber is preferably elongated in shape and the burners as well as the turbulating air pipes extend across the elongated heating chamber. The exhaust gases are withdrawn along the length of the heating chamber.

In another embodiment, the turbulating air pipes are positioned near the entrance end of the furnace heating chamber and the exhaust gases are withdrawn near the furnace entrance end. The exhaust conduit is spaced a sufficient distance from the entrance so that a pressure balance is maintained between the entrance and exit openings in the furnace. In this manner, drawing of ambient air through open entrance and exit openings into the furnace is minimized.

An important feature of the invention is that the heated combustion air provides an excellent vehicle for a low cost conversion to an oil fired system. Atomized oil can be injected directly into the combustion air upstream from the burners and the oil will be ignited in the burners. Desirably, the furnace contains gas burners and gaseous fuel is supplied to the gas burners so that the furnace contains a gas-fired as well as an oil-fired heating system.

BRIEF DESCRIPTION OF THE DRAWINGS

The invention will now be described with reference to the accompanying drawings in which.

DESCRIPTION OF THE PREFERRED EMBODIMENTS

Figure 1:
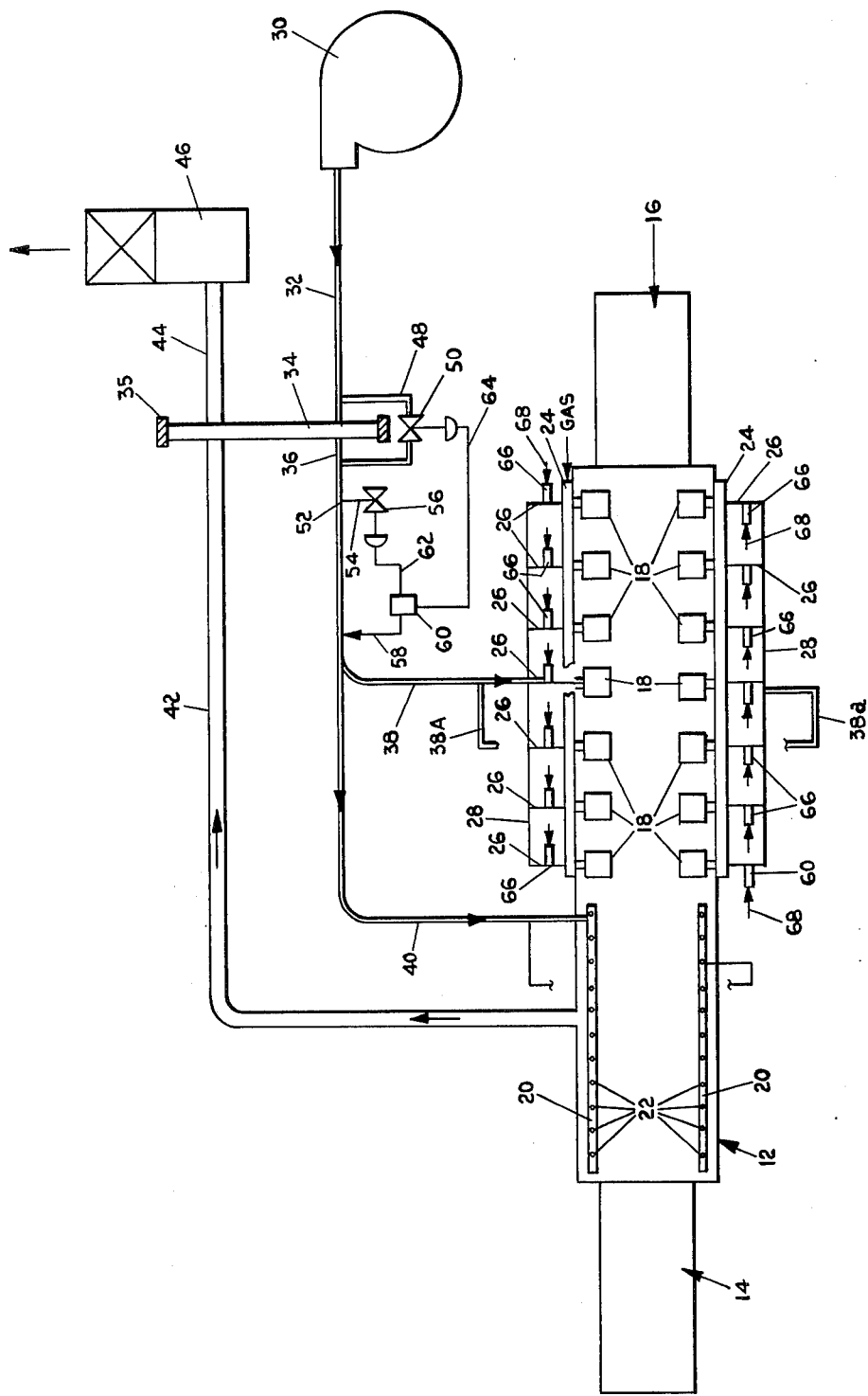
FIG. 1 is a schematic representation of a furnace with an airflow system and heat exchange of hot gases with combustion gases, illustrating a first embodiment of the invention.

Referring now to the drawings and to FIG. 1 in particular, there is shown a billet heating furnace 12 having a charge or entrance section 14 and a discharge section 16. The billet heating furnace is described more fully and claimed in U.S. Pat. No. 3,837,794 which is incorporated herein by reference. The furnace 12 has a plurality of gas burners 18 spaced in a discharge section thereof and a plurality of turbulating air pipes 20 at a preheating section thereof. The turbulating air pipes can extend throughout the length of the furnace if desired but preferably do not extend significantly into the burner-containing end of the furnace. A gas manifold 24 supplies combustible gas to the gas burners 18. Combustible air for the gas burners 18 is supplied through combustion air pipes 26 and manifold 28. A fan 30 is provided for supplying the air for combustion as well as the air for the turbulating air pipes 20. The air is pressurized in the fan 30 and is forced pressure through an air supply duct 32, through the cool side of a ceramic heat exchanger wheel 34 for preheating thereof, through hot air duct 36 and to branch ducts 38 and 38A. As illustrated, the ducts 38 and 38A are connected to the combustion air manifolds 28. A branch duct 40 supplies the heated air to the turbulating air pipes 20.

The hot gases in the furnace are withdrawn near the entrance end thereof through an exhaust duct 42 and passed through the other side of the ceramic heat exchanger wheel 34, through exhaust air duct 44 and through exhaust fan 46. The placing of the exhaust duct in the furnace is important for maximizing heat recovery. The exhaust duct 42 is placed near the entrance end of the furnace to draw the heated gases generally countercurrent to the flow of material through the furnace. However, the exhaust duct 42 must be spaced a sufficient distance from the entrance and of the furnace to maintain a pressure balance between the entrance and discharge openings of the furnace to minimize drawing into the furnace ambient air through such openings. The turbulating air pipes provide a much greater pressure resistance than the burners. Thus, the use of such pipes at the entrance end of the furnace allows the exhaust conduit to be placed nearer the entrance end of the furnace to maximize countercurrent flow of the combustion gases. The gases are drawn from the furnace by the exhaust fan 46.

The ceramic heat exchanger wheel 34 forms an important part of this invention and constitutes a rotatably driven wheel formed of a honeycomb ceramic material such as CER-VIT having passages axially passing therethrough. These materials have a high permeability and are highly efficient as heat exchangers. A more complete description of a type of heat exchanger wheel which can be used in accordance with the invention is disclosed and claimed in commonly assigned copending U.S. Pat. No. 3,978,913 filed Sept. 24, 1973, entitled INCINERATOR AND HEAT EXCHANGER STRUCTURE THEREFOR, and U.S. Pat. No. 3,942,953, and entitled FUME INCINERATOR AND SEAL STRUCTURE THEREFOR. The heat exchange wheel 34 has a thermally stable gap seal 35, preferably as disclosed and claimed in said U.S. Pat. No. 3,942,953. This gap seal comprises a thermally stable refractory material which surrounds the ceramic wheel and has temperature expansion characteristics similar to that of the ceramic wheel. Both the heat exchanger wheel and the seal are axially tapered in complementary fashion to allow a close, adjustable gap seal.

The use of the ceramic heat exchanger provides an obvious increased operating efficiency for the furnace but at a relatively modest dollar and space cost. The ceramic heat exchanger wheel with the gap seal has a relatively small cold air combustion blower 30 and a cold air exhaust fan 46. With other types of heat exchangers, cascading or multiple fans or extremely large fans would be required to supply enough air for the combustion process.

The turbulating air pipes 20 also require a relatively high volume and pressure and this volume and pressure can easily be supplied by the cold air fan through the ceramic heat exchanger.

A bypass duct 48 is provided between the air supply duct 32 and the hot air duct 36 to bypass the ceramic heat exchanger wheel 34. A valve 50 controls the flow of gases through the bypass duct 48. A trim burner 52 is provided in the hot air duct 36 to provide additional heat to the gases therein as desired. Combustible fuel is supplied to the trim burner 52 through a gas line 54. The flow of gas to the burner 52 is controlled by a valve 56. A temperature sensor 58 is provided in the hot air duct 36 downstream from the trim burner 52. Signals from the temperature sensor 58 are applied to a controller 60 which in turn controls the control valve 56 through a control line 62 and controls the control valve 50 through a control line 64.

On start-up of the furnace, the gases withdrawn from the furnace through the exhaust air duct 42 will be relatively cool and will not impart any significant heat to air in the air supply duct 32. It is thus necessary to supply additional heat to this combustion air on start-up of the furnace. This additional heat is provided by the trim burner 52 which is controlled by the temperature controller 58. Thus, the temperature controller operates the trim burner 52 to supply additional heat to the gases in the hot air duct 36 until the heat is supplied to the combustion air from the exhaust gases from the furnace. As the temperature of the exhaust gases rises, additional heat is provided to the combustion and turbulating gases as a result of the heat exchange process and the heat supplied by the trim burner 52 is decreased.

Occasionally, the charging of the furnace will be discontinued for a short period of time while the furnace is operating at high temperatures. When this occurs, the fuel to the burners 18 is decreased so as to decrease the heat supplied to the furnace. However, there will be a short time lag between the time the fuel is decreased and the time the furnace temperature is reduced because of the heat supplied to the combustion gases. Thus, under such conditions, the temperature of the exhaust gases in line 42 will increase, thereby increasing the amount of heat supplied to the combustion and turbulating gases in the hot air duct 36. The temperature rise of these gases is sensed by the temperature sensor 58 and responsive thereto, controller 60 opens valve 50 to permit some of the cool gas to bypass the heat exchanger 34. In this manner, the temperature of the combustion and turbulating gases is reduced.

Another important feature of the invention is the provision for a simple and inexpensive gas-oil conversion system for the furnace. To this end, atomizer injectors 66 having an oil supply line 68 are provided on each of the combustion air lines 26. The atomizer injectors 66 inject an atomized spray of oil into the heated combustion air in the line 26. The temperature of the air in lines 26 will be above the vaporization point of the oil, i.e. above 700° F (371° C) and will thereby vaporize and thoroughly mix the oil therewith. The oil will then be burned in the burners in lieu of the gas.

As an example of an operation of a furnace illustrated in FIG. 1 in accordance with the invention, the fresh air supplied through fan 30 will be at approximately 70° F (21° C) and will be raised to 900° F (482° C) after passing through the heat exchanger wheel 34. The temperature within the furnace will be about 1200°–1300° F (650°–705° C) and the gases withdrawn through duct 42 will be about 1200° F. The gases in the exhaust air duct 44 will be about 350° F (177° C) after passing through the ceramic heat exchanger wheel 34.

Figure 2:
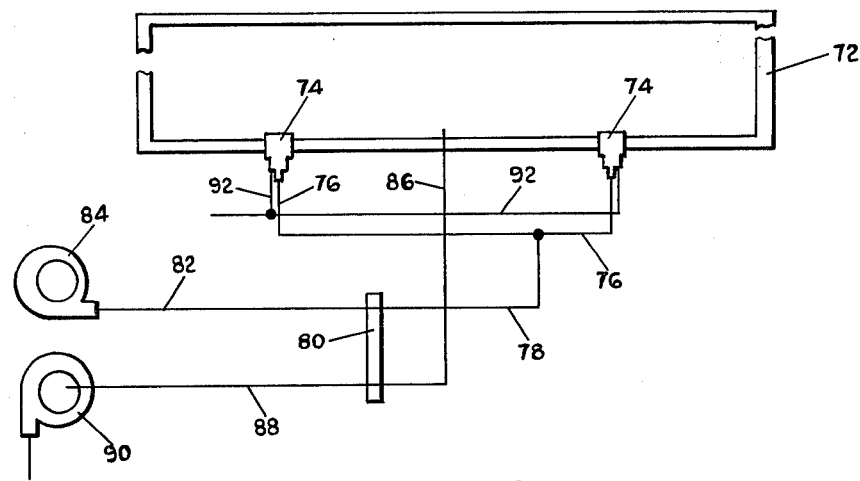
FIG. 2 is a schematic view of a soaking pit with a heat exchange system for combustion air, illustrating a second embodiment of the invention.

Reference is now made to FIG. 2 for a description of the second embodiment of the invention. A conventional soaking pit 72 has conventional burner 74 to which combustion air and gas (or oil) are supplied for combustion. Combustion air is supplied from a fan 84 through air supply duct 82, through one side of a ceramic heat exchanger wheel 80 and through combustion air supply lines 76 and 78. Combustion fuel is supplied through lines 92 to the burners.

Heated gases are withdrawn from the furnace by the exhaust fan 90 and are drawn through exhaust air duct 86, through the other side of the ceramic heat exchanger wheel 80, and through exhaust air duct 88.

In operation of the second embodiment of the invention, the combustion gases are preheated through heat exchange with the exhaust gases from the soaking pit. The ceramic heat exchanger wheel is rotated and is the same type of heat exchanger wheel as described in the first embodiment of the invention. By the heat exchanger wheel, the combustion bases are raised from 70° F (21° C) to about 900° F (482° C). The heat exchange operation reduces the exhaust gases from the soaking pit from about 1200° F (650° C) to about 350° F (177° C).

Figure 3:
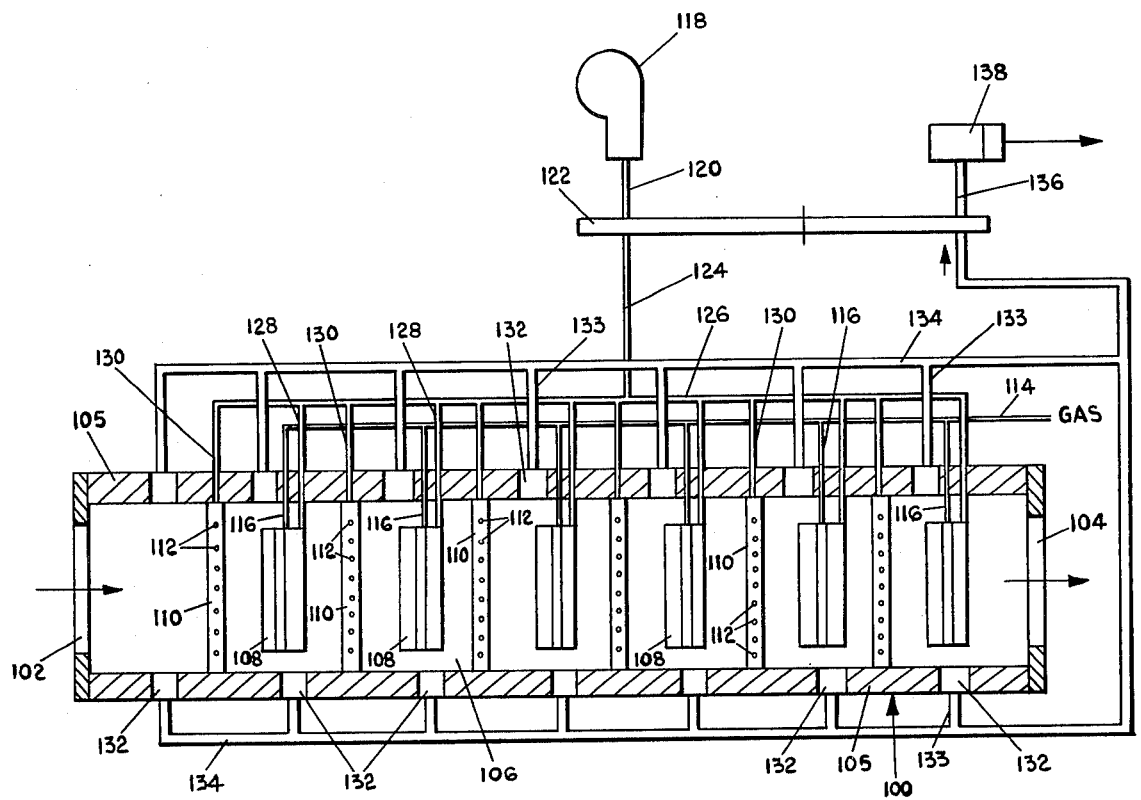
FIG. 3 is a schematic plan view of a strip heating oven incorporating a third embodiment of the invention.

Reference is now made to FIG. 3 for a description of a third embodiment of the invention. In FIG. 3, a strip heating furnace 100 is shown schematically in plan view. The furnace 100 is formed by insulated walls 105 and has an entrance slot 102, an elongated heating chamber 106 and a discharge slot 104 through which the work passes. Elongated gas burners 108 are provided transverse to the heating chamber 106 in juxtaposition to transverse turbulating air pipes 110. Nozzle openings 112 (like nozzle openings 22) are provided in the turbulating air pipes 110 for directing turbulating air against the work as it passes through the heating chamber 106. Combustible gas is supplied to the gas burners 108 from gas supply manifold 114 and branch gas pipes 116.

Combustible and turbulating air is supplied from an intake fan 118 which forces the air through an air supply duct 120, through the cool side of a ceramic heat exchanger wheel 122, through hot air duct 124, through hot air manifold 126 and branch air pipes 128 and 130. The combustion and turbulating air is heated by heat exchange via the ceramic heat exchanger wheel from the heat in the exhaust gases from the furnace. These gases are withdrawn from the furnace through exhaust air openings 132 spaced along the sides of the furnace, through exhaust ducts 133, exhaust manifolds 134, through the other side of the heat exchanger wheel 122 and through the exhaust fan 138. The draw for the exhaust gases is provided by the exhaust fan 138. The ceramic heat exchanger wheel 122 is of the same nature as the heat exchanger wheel 34 of FIG. 1 and the heat exchanger wheel 80 of FIG. 2.

In this embodiment, the gas burners 108 are alternated with the turbulating air pipes 110. The turbulating air pipes increase the heat transfer of the gases and significantly increase the efficiency of the furnace. In addition, the heat exchange between the exhaust gases and the combustion and turbulating gases reduces the energy requirements of the furnace and makes the furnace significantly more efficient. The combination of the heat exchanger and the turbulating gases has been found to increase the efficiency of a furnace of this nature to about 60% from at best about 20%.

The ceramic heat exchanger wheel makes the heat exchange possible and effective because of a low air loss across the thermally stable gap seal. The low pressure loss eliminated the need for the hot air fan or larger combustion blowers so that sufficient air is supplied to the burners and turbulating air pipes 110. Further, the heating of combustion gas greatly reduces the fuel requirements because the combustion gas does not have to be brought up to combustion temperature. Normally, the combustion gas must be brought up to a combustion temperature. Further, the heat exchange system provides an inexpensive manner for converting a natural gas heating system to an oil fired system. The heated combustion gases provide an excellent vehicle for injecting the atomized oil directly into the gas stream for combustion in the burners. This system avoids the conventional conversion system which requires a separate burner to heat combustion air to the oil injection temperature.

Further and alternatively, the heat exchange system provides a simple and inexpensive oil fired system in the event that natural gas is not available.

The invention provides a significant advantage over conventional shell and tube types of heat exchanger. Such heat exchangers are about fifty times heavier per heat exchange capacity and significantly larger and more expensive than the ceramic wheels of the invention.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. In an industrial heating furnace for billets and the like having an elongated heating chamber, at least one fuel burner in the heating chamber for supplying heated gases to the heating chamber, and means connected to the heating chamber for withdrawing exhaust gases from the heating chamber, the improvement which comprises:

a rotary ceramic heat exchanger wheel;

means for supplying air to a cold side of said heat exchanger wheel;

first conduit means in communication with said air supply means through said heat exchanger wheel and said elongated heating chamber for withdrawing heated air from a hot side of said heat exchanger wheel and for passing the heated air to the fuel burner as combustion air;

second conduit means in communication with the furnace and the rotary ceramic heat exchanger wheel to pass gases from the exhaust gas withdrawing means to the hot side of the rotary heat exchanger wheel;

means at a cool side of the rotary heat exchanger wheel and in communication with the second conduit means through the rotary heat exchanger wheel for withdrawing and exhausting the exhaust gases through the rotary heat exchanger wheel;

means for imparting rotary motion to the heat exchanger wheel whereby the heat of the exhaust gases is transferred to the combustion air;

a plurality of turbulating air pipes, each of which has a plurality of nozzle openings therein, the air pipes being spaced along at least a portion of the length of the elongated heating chamber and positioned within the heating chamber to direct turbulating gases against the work therein as it passes therethrough; and third conduit means between the first conduit means and the turbulating air pipes for passing the heated air to the turbulating air pipes;

whereby heated air streams under pressure are directed against the work as it passes through the elongated chamber.

2. An industrial heating furnace for billets and the like according to claim 1 and further comprising a thermally stable refractory seal member surrounding said heat exchanger wheel and forming a gap seal therewith.

3. An industrial heating furnace according to claim 1 wherein the turbulating air pipes are juxtaposed to a plurality of the burners along the length the furnace heating chamber.

4. An industrial heating furnace according to claim 3 wherein the burners and the turbulating air pipes extend across the elongated heating chamber in an alternating pattern.

5. An industrial heating furnace according to claim 4 wherein the exhaust gas withdrawing means are positioned along the length of the heating chamber.

6. An industrial heating furnace according to claim 1 wherein the heating chamber has an entrance end and an exit end; means are provided for passing the articles from the entrance end to the exit end; and the turbulating air pipes are positioned near the entrance end of the furnace heating chamber, which end is devoid of burners.

7. An industrial heating furnace according to claim 6 wherein the exhaust gas withdrawing means are positioned near to the entrance end of the heating chamber, but spaced from the entrance end of the heating chamber so as to maintain a pressure balance between the entrance and exit ends of the furnace so as to minimize drawing air in through the entrance and exit ends of the furnace, whereby the hot gases from the other portions of the heating chamber are drawn through the entrance end before being exhausted from the furnace.

8. An industrial heating furnace according to claim 1 and further comprising means for injecting an atomized spray of a normally liquid fuel into the first conduit means upstream of the burner.

9. An industrial heating furnace according to claim 8 wherein the burner is a gas burner and further comprising means for supplying a normally gaseous fuel to the gas burner.

10. In an industrial heating furnace for billets and the like having an elongated heating chamber, heating means for supplying heated gases to the heating chamber, means for withdrawing exhaust gases from the heating chamber, and a plurality of turbulating air pipes each of which has a plurality of nozzle openings therein, the air pipes being positioned within the heating chamber in close proximity to the work as it passes through the furnace to direct turbulating gases against the work therein as it passes therethrough, the improvement in the heating means which comprises:

a rotary ceramic heat exchanger wheel;

means for supplying air to a cold side of the heat exchanger wheel;

first conduit means in communication with the air supply means through the heat exchanger wheel and the heating chamber for withdrawing heated air from the hot side of the heat exchanger wheel and for passing the heated air to the turbulating air pipes;

second conduit means in communication with the exhaust gas withdrawing means and the rotary heat exchanger wheel to pass gases from the exhaust gas withdrawing means to the hot side of the rotary heat exchanger wheel;

means at a cool side of the heat exchanger wheel and in communication with the second conduit means through the rotary heat exchanger wheel for withdrawing and exhausting the exhaust gases through the rotary heat exchanger wheel; and means for imparting rotary motion to the heat exchanger wheel whereby the heat of the exhaust gases is transferred to the turbulating air pipes.

11. An industrial heating furnace according to claim 10 wherein the turbulating air pipes are juxtaposed to a plurality of burners along the length the furnace heating chamber.

12. An industrial heating furnace according to claim 11 wherein the heating chamber is elongated in shape and the burners and the turbulating air pipes extend across the elongated heating chamber.

13. An industrial heating furnace according to claim 12 wherein the exhaust gas withdrawing means are positioned along the length of the heating chamber.

14. An industrial heating furnace according to claim 10 wherein the heating chamber has an entrance end and an exit end, and means are provided for passing the articles from the entrance end to the exit end of the heating chamber; and wherein the turbulating air pipes are positioned near the entrance end of the furnace heating chamber, which end is devoid of burners.

15. An industrial heating furnace comprising:

an elongated heating chamber having an entrance end;

a plurality of burners extending across the heating chamber;

means for supplying combustible air and fuel to the burners for directing burning gases against the work passing through the heating chamber;

a plurality of turbulating air pipes extending across the heating chamber and juxtaposed to the burners, the air pipes having nozzle openings therealong for directing turbulating air against the work passing through the elongated chamber;

means for supplying air under pressure to the turbulating air pipes to increase the heating efficiency of the furnace.

16. An industrial heating furnace according to claim 1 and further comprising means in the first conduit to detect the temperature of the air flowing therethrough; and means coupled to the temperature detecting means for controlling the temperature of the gases passing through the first conduit means to the elongated chamber to maintain the temperature of the gases therein below a predetermined minimum.

17. An industrial heating furnace according to claim 10 and further comprising means for pressurizing air in said first air supply means.

* * * * *